US011007997B2

(12) United States Patent
Okamura et al.

(10) Patent No.: US 11,007,997 B2
(45) Date of Patent: May 18, 2021

(54) CONTROL SYSTEM FOR VEHICLE

(71) Applicant: TOYOTA JIDOSHA KABUSHIKI KAISHA, Toyota (JP)

(72) Inventors: Yukari Okamura, Gotemba (JP); Yasuhiro Oshiumi, Gotemba (JP); Tatsuya Imamura, Okazaki (JP); Kazuma Aoki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 71 days.

(21) Appl. No.: 16/366,450

(22) Filed: Mar. 27, 2019

(65) Prior Publication Data

US 2019/0299976 A1 Oct. 3, 2019

(30) Foreign Application Priority Data

Mar. 28, 2018 (JP) ............................ JP2018-061810

(51) Int. Cl.

*B60W 20/20* (2016.01)
*B60W 20/40* (2016.01)
*B60W 30/188* (2012.01)
*B60W 30/18* (2012.01)
*B60W 10/06* (2006.01)
*B60W 10/08* (2006.01)

(52) U.S. Cl.

CPC ............ *B60W 20/20* (2013.01); *B60W 10/06* (2013.01); *B60W 10/08* (2013.01); *B60W 20/40* (2013.01); *B60W 30/1884* (2013.01); *B60W 30/18172* (2013.01); *B60W 2510/0638* (2013.01); *B60W 2510/081* (2013.01); *B60W 2520/26* (2013.01)

(58) Field of Classification Search

CPC ...... B60W 20/20; B60W 20/40; B60W 10/06; B60W 10/08; B60W 30/18172; B60W 30/1884; B60W 2520/26

See application file for complete search history.

(56) References Cited

U.S. PATENT DOCUMENTS 7,163,480 B2 * 1/2007 Supina .................. B60W 20/30 475/5
7,634,344 B2 * 12/2009 Masuda ................... B60K 6/44 701/69
9,352,737 B2 * 5/2016 Pietron ................. B60W 20/40
9,415,676 B2 * 8/2016 Hori ...................... B60W 10/06
2016/0368361 A1 12/2016 Endo et al.

FOREIGN PATENT DOCUMENTS

JP 2017-7437 A 1/2017

* cited by examiner

*Primary Examiner* — Erin D Bishop
(74) *Attorney, Agent, or Firm* — Sughrue Mion, PLLC

(57) ABSTRACT

A control system for preventing engine stall due to slippage of a wheel during propulsion in a fixed mode in which an engine and the wheel are rotated at a fixed ratio. When a wheel slips in a first mode in which an engine and the wheel are rotated at a predetermined ratio, an operating mode is shifted to a second mode in which a torque transmission between the engine and the wheel is interrupted and the vehicle is propelled by torque of driving machine connected to the wheel, or to a third mode in which the vehicle is propelled by delivering torque of the engine to the wheel while establishing a reaction torque by a predetermined rotary member.

11 Claims, 13 Drawing Sheets

START
S1 Fixed Mode ? NO
YES
S2 F_slip=ON? NO
YES
S3 Calculate Predicted Speeds of First Motor in HV-Lo Mode and HV-Hi Mode
S4 N_Lo<N_max? NO
YES
S5 Select Mode in which Predicted Speed of First Motor is Lower
S7 Select Disconnecting Mode
S6 Shift Operating Mode
RETURN

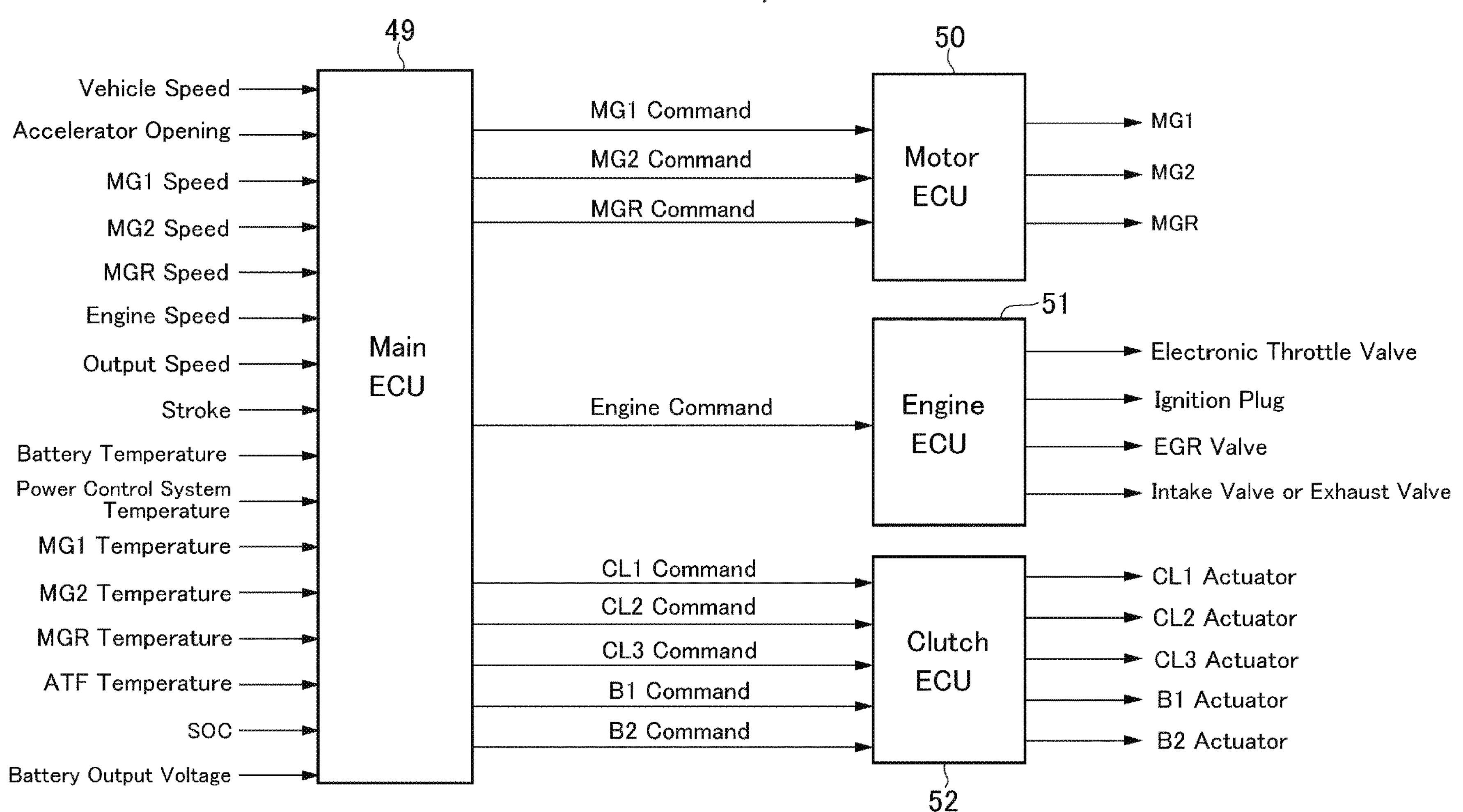
Fig. 3
48
49
Main ECU
50
Motor ECU
51
Engine ECU
52
Clutch ECU
Vehicle Speed
Accelerator Opening
MG1 Speed
MG2 Speed
MGR Speed
Engine Speed
Output Speed
Stroke
Battery Temperature
Power Control System Temperature
MG1 Temperature
MG2 Temperature
MGR Temperature
ATF Temperature
SOC
Battery Output Voltage
MG1 Command
MG2 Command
MGR Command
Engine Command
CL1 Command
CL2 Command
CL3 Command
B1 Command
B2 Command
MG1
MG2
MGR
Electronic Throttle Valve
Ignition Plug
EGR Valve
Intake Valve or Exhaust Valve
CL1 Actuator
CL2 Actuator
CL3 Actuator
B1 Actuator
B2 Actuator

Fig. 4

| Operating Mode | | | CL1 | CL2 | B1 | MG1 | MG2 | ENG |
|---|---|---|---|---|---|---|---|---|
| HV Mode | HV-Lo Mode | | ● | – | – | G | M | ON |
| | HV-Hi Mode | | – | ● | – | G | M | ON |
| | Fixed Mode | | ● | ● | – | | | ON |
| EV Mode | Dual-Motor Mode | EV-Lo Mode | ● | – | ● | M | M | OFF |
| | | EV-Hi Mode | – | ● | ● | M | M | OFF |
| | Single-Motor Mode | | – | – | – | | M | OFF |

CONTROL SYSTEM FOR VEHICLE

CROSS-REFERENCE TO RELATED APPLICATIONS

The present disclosure claims the benefit of Japanese Patent Application No. 2018-061810 filed on Mar. 28, 2018 with the Japanese Patent Office, the disclosures of which are incorporated herein by reference in its entirety.

BACKGROUND

Field of the Disclosure

Embodiments of the present disclosure relate to the art of a control system for a vehicle in which an operating mode can be selected from a plurality of modes.

Discussion of the Related Art

JP-A-2017-007437 describes a hybrid vehicle comprising: a power split mechanism unit having a first rotary element connected to an engine, a second rotary element connected to a first motor, and a third rotary element connected to drive wheels; a first clutch that connects a pair of the rotary elements; and a second clutch that connects another pair of the rotary elements. In the hybrid vehicle taught by JP-A-2017-007437, a low mode is established by engaging the first clutch, a high mode is established by engaging the second clutch, and a fixed mode is established by engaging the first clutch and the second clutch. In the low mode and the high mode, the hybrid vehicle is propelled while establishing a reaction torque by the first motor, and a speed of the engine can be controlled continuously by controlling a speed of the first motor. On the other hand, in the fixed mode, a speed ratio between the engine and drive wheels is constant.

Thus, in the hybrid vehicle taught by JP-A-2017-007437, the engine is rotated at a constant speed in accordance with the speed of the drive wheels. In the hybrid vehicle taught by JP-A-2017-007437, therefore, the engine speed is increased when the speed of the drive wheels is increased by e.g., a slip of the drive wheels. By contrast, when the slipping drive wheels grip a road surface, the speed of the drive wheels drops abruptly thereby reducing the engine speed abruptly. For this reason, if the drive wheels slip on a road surface during propulsion in the fixed mode, an engine stall would be caused by such abrupt reduction in the speed of the drive wheel when the drive wheels grip the road surface again.

SUMMARY

Aspects of embodiments of the present disclosure have been conceived noting the foregoing technical problems, and it is therefore an object of the present disclosure to provide a vehicular control system configured to prevent an occurrence of an engine stall due to slippage of a drive wheel during propulsion in a fixed mode in which an engine and the drive wheels are rotated at a fixed ratio.

The control system according to the exemplary embodiment of the present disclosure is applied to a hybrid vehicle in which an operating mode can be selected from: a first mode in which an engine and drive wheels are rotated at a predetermined speed ratio, and at least any one of: a second mode in which a torque transmission between the engine and the drive wheels is interrupted, and the vehicle is propelled by a drive torque generated by a driving rotary machine connected to the drive wheels; and a third mode in which the vehicle is propelled by delivering an output torque of the engine to the drive wheels while establishing a predetermined reaction torque by a predetermined rotary member. The control system is provided with a controller that selects the operating mode of the vehicle. Specifically, the controller is configured to determine that the drive wheel idles during propulsion in the first mode, and to shift the operating mode from the first mode to the second mode or the third mode upon determination of idling of the drive wheel.

In a non-limiting embodiment, the operating mode of the vehicle may be further selected from: a fourth mode in which the predetermined rotary member is rotated at a second predetermined speed given that the drive wheel stops and the engine is rotated at a first predetermined speed; and a fifth mode in which the predetermined rotary member is rotated at a speed lower than the second predetermined speed in the fourth mode given that the drive wheel stops and the engine is rotated at the first predetermined speed. In addition, the third mode may include the fifth mode.

In a non-limiting embodiment, the operating mode of the vehicle may be be selected from the second mode and the third mode. The controller may be further configured to: maintain a rotational speed of the engine to a speed when the drive wheel idles, and calculate a predicted speed of the predetermined rotary member of a case in which the idling drive wheel stops in the third mode, upon determination of idling of the drive wheel; determine whether the predicted speed of the predetermined rotary member is higher than a maximum allowable speed of the predetermined rotary member; select the third mode upon determination of idling of the drive wheel, in a case that the predicted speed of the predetermined rotary member is lower than the maximum allowable speed of the predetermined rotary member; and select the second mode upon determination of idling of the drive wheel, in a case that the predicted speed of the predetermined rotary member is higher than the maximum allowable speed of the predetermined rotary member.

In a non-limiting embodiment, the predetermined rotary member may include a rotary machine. The vehicle may comprises a drive unit that performs a differential action among at least a first rotary element connected to the engine, a second rotary element connected to the rotary machine, and a third rotary element connected to the drive wheels. The third mode may include a hybrid mode in which the output torque of the engine is delivered to the drive wheels by establishing a reaction torque by the rotary machine.

In a non-limiting embodiment, the drive unit may comprises: a plurality of rotary elements including the first rotary element, the second rotary element, and the third rotary element; a first engagement device that selectively connects a predetermined pair of the rotary elements; and a second engagement device that selectively connects another predetermined pair of the rotary elements. The first mode may be established by engaging both of the first engagement device and the second engagement device. The second mode may be established by disengaging both of the first engagement device and the second engagement device. The third mode may be established by engaging any one of the first engagement device and the second engagement device while disengaging other one of the first engagement device and the second engagement device.

Thus, when the slip of the drive wheel is detected during propulsion in the first mode in which the engine and the drive wheels are rotated at the predetermined speed ratio, the control system according to the exemplary embodiment shifts the operating mode to the second mode in which a torque transmission between the engine and the drive wheels is interrupted and the vehicle is powered by the driving rotary machine connected to the drive wheels, or to the third mode in which the vehicle is propelled by delivering the output torque of the engine to the drive wheels while establishing a reaction torque by the predetermined rotary member. According to the exemplary embodiment of the present disclosure, therefore, a speed of the engine will not be reduced by a change in a rotational speed of the drive wheel when the slipping drive wheel grips a road surface again. For this reason, an occurrence of engine stall can be avoided. In addition, torque can be delivered continuously from the driving rotary machine and the engine to the drive wheels in the second mode and the third mode. According to the exemplary embodiment of the present disclosure, therefore, reduction in the drive force and stability of the vehicle can be prevented even when the slipping drive wheel grips the road surface again.

BRIEF DESCRIPTION OF THE DRAWINGS

Features, aspects, and advantages of exemplary embodiments of the present disclosure will become better understood with reference to the following description and accompanying drawings, which should not limit the disclosure in any way.

FIG. 3 is a block diagram showing a structure of an electronic control unit;

FIG. 4 is a table showing engagement states of engagement devices and operating conditions of the prime movers in each operating mode;

DETAILED DESCRIPTION OF THE PREFERRED EMBODIMENT(S)

Figure 1:
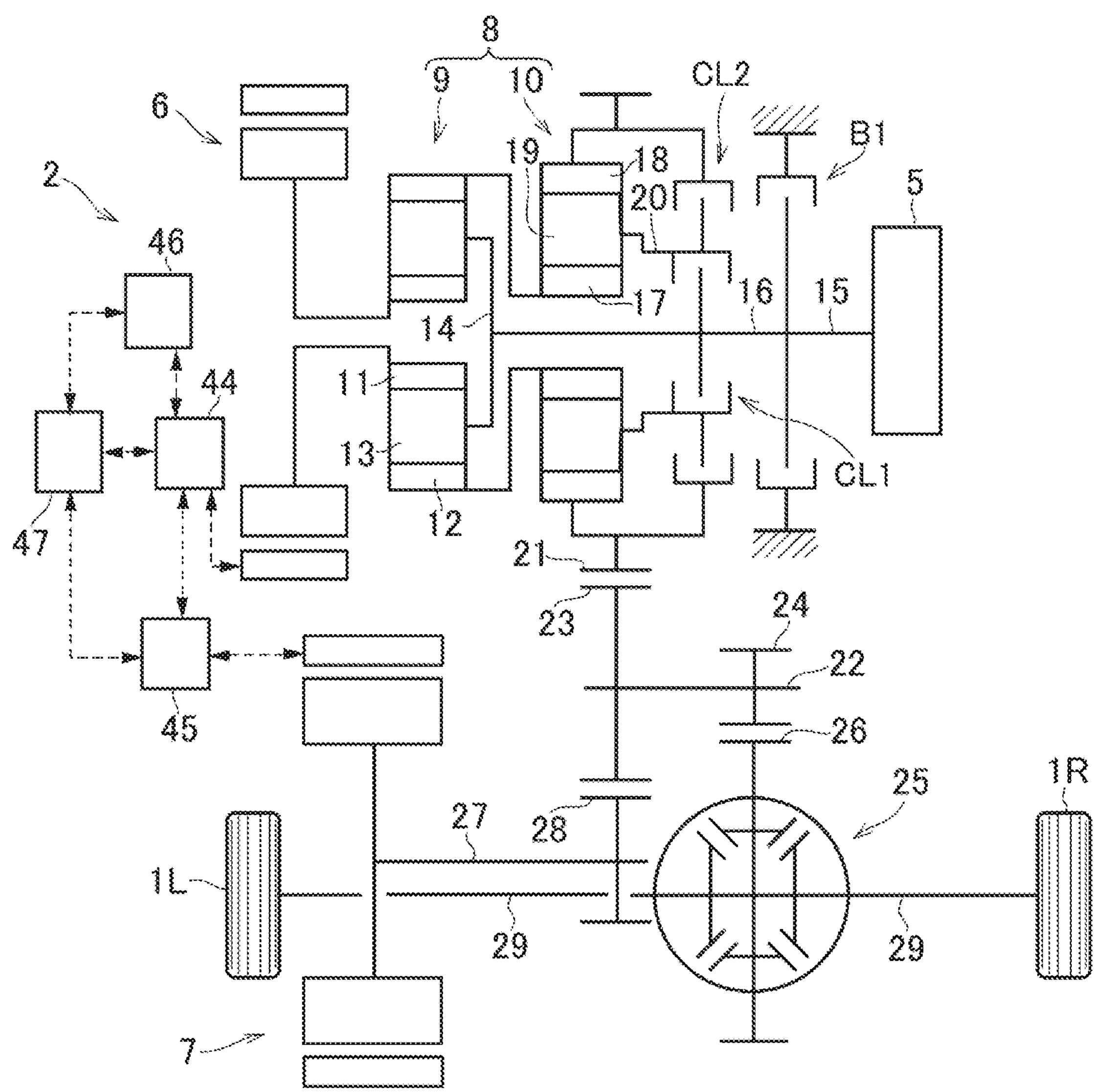
FIG. 1 is a skeleton diagram schematically showing a structure of a first drive unit of the vehicle according to at least one embodiment of the present disclosure.
Figure 2:
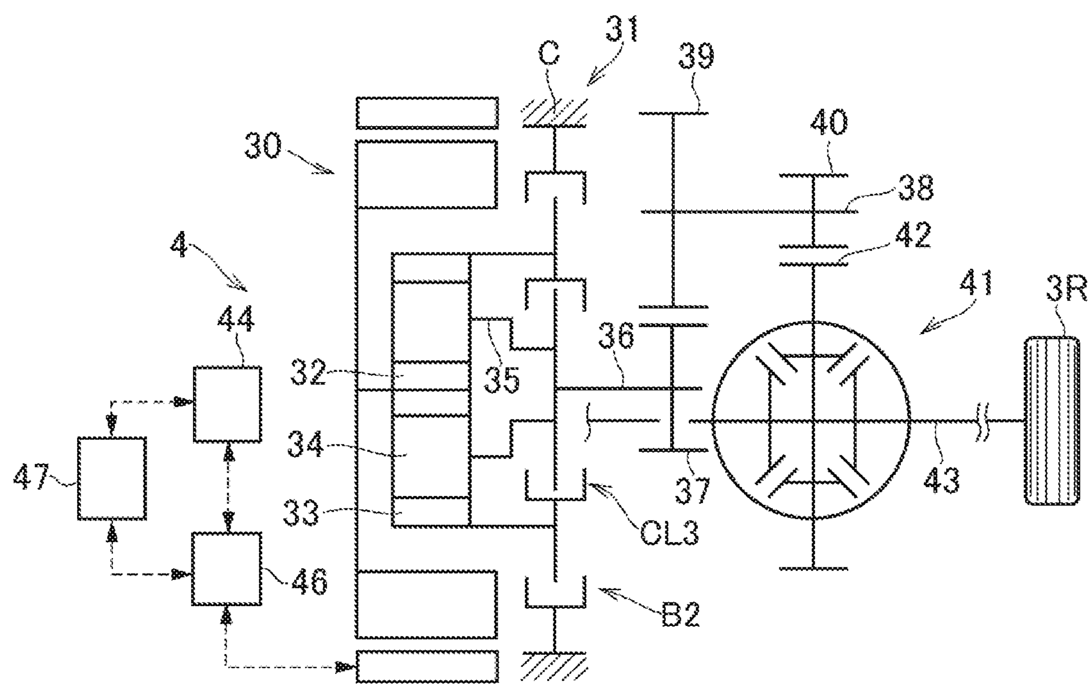
FIG. 2 is a skeleton diagram schematically showing a structure of a second drive unit of the vehicle according to at least one embodiment of the present disclosure.

An exemplary embodiments of the present disclosure will now be explained with reference to the accompanying drawings. Referring now to FIGS. 1 and 2, there are shown one example of the vehicle to which the control system according to the present disclosure is applied. The vehicle comprises a first drive unit 2 shown in FIG. 1 that drives a pair of front wheels 1R and 1L, and a second drive unit 4 shown in FIG. 2 that drives a pair of rear wheels 3R and 3L. The first drive unit 2 is a hybrid drive unit comprising an engine 5, a first motor 6 and a second motor 7. Specifically, the first motor 6 is a motor-generator having a generating function (abbreviated as "MG1" in the drawings). In the vehicle according to the exemplary embodiment, a speed of the engine 5 is controlled by the first motor 6, and the second motor 7 is driven by electric power generated by the first motor 6 to generate a drive force for propelling the vehicle. The motor-generator having a generating function may also be adopted as the second motor 7 (abbreviated as "MG2" in the drawings). In the exemplary embodiment, accordingly, the first motor 6 serves as a "rotary machine" and a "predetermined rotary member".

A power split mechanism 8 is connected to the engine 5. The power split mechanism 8 includes a power split section 9 that distributes torque generated by the engine 5 to the first motor 6 side and to an output side, and a transmission section 10 that alters a torque split ratio.

For example, a single-pinion planetary gear unit adapted to perform differential action among three rotary elements may be used as the power split section 9. Specifically, the power split section 9 comprises: a sun gear 11; a ring gear 12 as an internal gear arranged concentrically with the sun gear 11; pinion gears 13 interposed between the sun gear 11 and the ring gear 12 while being meshed with both gears 11 and 12; and a carrier 14 supporting the pinion gears 13 in a rotatable manner. In the power split section 9, accordingly, the sun gear 11 serves mainly as a reaction element, the ring gear 12 serves mainly as an output element, and the carrier 14 serves mainly as an input element.

An output shaft 15 of the engine 5 is connected to an input shaft 16 of the power split mechanism 8 connected to the carrier 14 so that power of the engine 5 is applied to the carrier 14. Optionally, an additional gear unit may be interposed between the input shaft 16 and the carrier 14, and a damper device and a torque converter may be interposed between the output shaft 15 and the input shaft 16.

The sun gear 11 is connected to the first motor 6. In the first drive unit 2 shown in FIG. 1, the power split section 9 and the first motor 6 are arranged concentrically with a rotational center axis of the engine 5, and the first motor 6 is situated on an opposite side of the engine 5 across the power split section 9. The transmission section 10 is interposed coaxially between the power split section 9 and the engine 5.

Specifically, the transmission section 10 is a single pinion planetary gear unit comprising: a sun gear 17; a ring gear 18 as an internal gear arranged concentrically with the sun gear 17; pinion gears 19 interposed between the sun gear 17 and the ring gear 18 while being meshed with both gears 17 and 18; and a carrier 20 supporting the pinion gears 19 in a rotatable manner. Thus, the transmission section 10 is also adapted to perform a differential action among the sun gear 17, the ring gear 18, and the carrier 20. In the transmission section 10, the sun gear 17 is connected to the ring gear 12 of the power split section 9, and the ring gear 18 is connected to an output gear 21.

In order to use the power split section 9 and the transmission section 10 as a complex planetary gear unit, a first clutch CL1 is disposed to selectively connect the carrier 20 of the transmission section 10 to the carrier 14 of the power split section 9. To this end, for example, a wet-type multiple plate friction clutch or a dog clutch may be used as the first clutch CL1. Thus, in the first drive unit 2 shown in FIG. 1, the power split section 9 is connected to the transmission section 10 to serve as a complex planetary gear unit by bringing the first clutch CL1 into engagement. In the complex planetary gear unit thus formed, the carrier 14 of the power split section 9 is connected to the carrier 20 of the transmission section 10 to serve as an input element, the sun gear 11 of the power split section 9 serves as a reaction element, and the ring gear 18 of the transmission section 10 serves as an output element. In the embodiment, accordingly, the carrier 14 or the carrier 20 serves as a first rotary element, the sun gear 11 serves as a second rotary element, and the ring gear 18 serves as a third rotary element.

A second clutch CL2 is disposed to rotate the rotary elements of the transmission section 10 integrally. For example, a friction clutch and a dog clutch may also be used as the second clutch CL2 to selectively connect the carrier 20 to the ring gear 18 or the sun gear 17, or to connect the sun gear 17 to the ring gear 18. In the first drive unit 2 shown in FIG. 1, specifically, the second clutch CL2 is adapted to connect the carrier 20 to the ring gear 18 to rotate the rotary elements of the transmission section 10 integrally. The first clutch CL1 and the second clutch CL2 are arranged coaxially with the engine 5, the power split section 9, and the transmission section 10 on the opposite side of the power split section 9 across the transmission section 10. The first clutch CL1 and the second clutch CL2 may be arranged not only in parallel to each other in a radial direction but also in tandem in an axial direction. In the first drive unit 2 shown in FIG. 1, the first clutch CL1 and the second clutch CL2 are arranged radially parallel to each other and hence an axial length of the drive unit can be shortened. In addition, since a width of the drive unit will not be widened by the clutches CL1 and CL2, the number of friction plates of the frictional clutch can be reduced.

A counter shaft 22 extends parallel to a common rotational axis of the engine 5, the power split section 9, and the transmission section 10. A driven gear 23 is fitted onto one end of the counter shaft 22 to be meshed with the output gear 21, and a drive gear 24 is fitted onto the other end of the counter shaft 22 to be meshed with a ring gear 26 of a differential gear unit 25 as a final reduction. The driven gear 23 is also meshed with a drive gear 28 fitted onto a rotor shaft 27 of the second motor 7 so that power or torque of the second motor 7 is synthesized with power or torque of the output gear 21 at the driven gear 23 to be distributed from the differential gear unit 25 to the front wheels 1R and 1L via each of the drive shafts 29.

In order to selectively stop a rotation of the output shaft 15 or the input shaft 16 for the purpose of delivering the drive torque generated by the first motor 6 to the front wheels 1R and 1L, a first brake B1 is arranged in the first drive unit 2. For example, a frictional engagement device or a dog brake may be used as the first brake B1. Specifically, the carrier 14 of the power split section 9 and the carrier 20 of the transmission section 10 are allowed to serve as reaction elements, and the sun gear 11 of the power split section 9 is allowed to serve as an input element by applying the first brake B1 to halt the output shaft 15 or the input shaft 16. To this end, the first brake B1 may be adapted to stop the rotation of the output shaft 15 or the input shaft 16 not only completely but also incompletely to apply a reaction torque to those shafts. Alternatively, a one-way clutch may be used instead of the first brake B1 to restrict a reverse rotation of the output shaft 15 or the input shaft 16.

The second drive unit 4 is mounted on the hybrid vehicle to deliver a power or a torque of a rear motor 30 to a pair of rear wheels 3R and 3L. Here, it is to be noted that the left rear wheel 3L is not illustrated in FIG. 2 for the sake of illustration. A motor-generator having a generating function may also be used as the rear motor 30 (abbreviated as "MGR" in the drawings), and the rear motor 30 is connected to a transmission 31. A gear stage of the transmission 31 may be selected from a speed reducing stage in which the torque of the rear motor 30 is multiplied, and a fixed stage in which the torque of the rear motor 30 is transmitted without being multiplied.

As shown in FIG. 2, the transmission 31 is a single-pinion planetary gear unit comprising: a sun gear 32; a ring gear 33 as an internal gear arranged concentrically with the sun gear 32; pinion gears 34 interposed between the sun gear 32 and the ring gear 33 while being meshed with both gears 32 and 33; and a carrier 35 supporting the pinion gears 34 in a rotatable manner.

In the transmission 31, the sun gear 32 is connected to the rear motor 30 to serve as an input element, and the carrier 35 is connected to an output shaft 36 to serve as an output element. In order to establish the fixed stage in the transmission 31, a third clutch CL3 is arranged in the second drive unit 4. For example, a friction clutch and a dog clutch may also be used as the third clutch CL3 to selectively connect the sun gear 32 to the ring gear 33 or the carrier 35, or to connect the ring gear 33 to the carrier 35. In the second drive unit 4 shown in FIG. 2, specifically, the third clutch CL3 is adapted to connect the ring gear 33 to the carrier 35 to establish the fixed stage in the transmission 31.

In order to establish the speed reducing stage in the transmission 31, a second brake B2 is arranged in the second drive unit 4. For example, a frictional engagement device or a dog brake may also be used as the second brake B2. Specifically, the second brake B2 stops a rotation of the ring gear 33 of the transmission 31 by engaging the ring gear 33 with a casing C holding the second drive unit 4 so that the ring gear 33 is allowed to serve as a reaction element. To this end, the second brake B2 may be adapted to stop the rotation of the ring gear 33 not only completely but also incompletely.

A drive gear 37 is fitted onto the output shaft 36 of the transmission 31, and a counter shaft 38 extends parallel to the output shaft 36. A driven gear 39 is fitted onto one end of the counter shaft 38 to be meshed with the drive gear 37. Specifically, the driven gear 39 is diametrically larger than the drive gear 37 so that an output torque of the transmission 31 is transmitted through the driven gear 39 while being multiplied. A drive gear 40 is fitted onto the other end of the counter shaft 38 to be meshed with a ring gear 42 of a differential gear unit 41 as a final reduction. The differential gear unit 41 is connected to driveshafts 43 to deliver the power of the rear motor 30 to the right rear wheel 3R and the left rear wheel 3L.

As shown in FIGS. 1 and 2, a first power control system 44 is connected to the first motor 6, a second power control system 45 is connected to the second motor 7, and a third power control system 46 is connected to the rear motor 30. Each of the first power control system 44, the second power control system 45, and the third power control system 46 individually includes an inverter and a converter. The first power control system 44, the second power control system 45, and the third power control system 46 are connected to one another, and also connected individually to a battery 47 including a lithium ion battery and a capacitor. For example, when the first motor 6 is operated as a generator while establishing a reaction torque, an electric power generated by the first motor 6 may be supplied directly to the second motor 7 and the rear motor 30 without passing through the battery 47. In the vehicle according to the embodiment, the second motor 7 serves as a driving rotary machine.

In order to control the first power control system 44, the second power control system 45, the third power control system 46, the engine 5, the clutches CL1, CL2, CL3, and the brakes B1,B2, the vehicle is provided with an electronic control unit (to be abbreviated as the "ECU" hereinafter) 48 as a controller. The ECU 48 is composed mainly of a microcomputer, and as shown in FIG. 3, the ECU 48 comprises a main ECU 49, a motor ECU 50, an engine ECU 51, and a clutch ECU 52.

The main ECU 49 is configured to execute a calculation based on incident data transmitted from sensors as well as maps and formulas installed in advance, and transmits a calculation result to the motor ECU 50, the engine ECU 51, and the clutch ECU 52 in the form of command signal. For example, the main ECU 49 receives data about; a vehicle speed; an accelerator position; a speed of the first motor 6; a speed of the second motor 7; a speed of the rear motor 30; a speed of the output shaft 15 of the engine 5; an output speed such as a speed of the ring gear 18 of the transmission section 10 or the counter shaft 22; strokes of pistons of the clutches CL1, CL2, CL3, the brakes B1, and B2; a temperature of the battery 47; temperatures of the power control systems 44, 45, and 46; a temperature of the first motor 6; a temperature of the second motor 7; a temperature of the rear motor 30; a temperature of oil (i.e., ATF) lubricating the power split mechanism 8 and the transmission 31; a state of charge (to be abbreviated as the "SOC" hereinafter) level of the battery 47; an output voltage of the battery 47; a shift position and so on.

Specifically, command signals of output torques and speeds of the first motor 6, the second motor 7 and the rear motor 30 are transmitted from the main ECU 49 to the motor ECU 50. Likewise, command signals of an output torque and a speed of the engine 5 are transmitted from the main ECU 49 to the engine ECU 51. Further, command signals of torque transmitting capacities (including "0") of the clutches CL1, CL2, CL3, and the brakes B1, B2 are transmitted from the main ECU 49 to the clutch ECU 52.

The motor ECU 50 calculates current values applied to the first motor 6, the second motor 7, and the rear motor 30 based on the data transmitted from the main ECU 49, and transmits calculation results to the motors 6, 7, and 30 in the form of command signals. In the vehicle according to the embodiment, an AC motor is used individually as the first motor 6, the second motor 7, and the rear motor 30. In order to control the AC motor, the command signal transmitted from the motor ECU 50 includes command signals for controlling a frequency of a current generated by the inverter and a voltage value boosted by the converter.

The engine ECU 51 calculates current values to control opening degrees of an electronic throttle valve, an EGR (Exhaust Gas Restriction) valve, an intake valve, and an exhaust valve, and to activate an ignition plug, based on the data transmitted from the main ECU 49, and transmits calculation results to the valves and the plug in the form of command signals. Thus, the engine ECU 51 transmits command signals for controlling a power, an output torque and a speed of the engine 5.

The clutch ECU 52 calculates current values supplied to actuators controlling engagement pressures of the clutches CL1, CL2, CL3, and the brakes B1, B2, based on the data transmitted from the main ECU 49, and transmits calculation results to the actuators in the form of command signals.

In the vehicle according to the embodiment, an operating mode may be selected from a hybrid mode (to be abbreviated as the "HV mode" hereinafter) in which the vehicle is propelled by a drive torque generated by the engine 5, and an electric vehicle mode (to be abbreviated as the "EV mode" hereinafter) in which the vehicle is propelled by drive torques generated by the first motor 6 and the second motor 7 without using the engine 5. The HV mode may be selected from a hybrid-low mode (to be abbreviated as the "HV-Lo mode" hereinafter), a hybrid-high mode (to be abbreviated as the "HV-Hi mode" hereinafter), and a fixed mode. Specifically, in the HV-Lo mode, a rotational speed of the engine 5 (i.e., a rotational speed of the input shaft 16) is increased higher than a rotational speed of the ring gear 18 of the transmission section 10 when a rotational speed of the first motor 6 is reduced substantially to zero. In turn, in the HV-Hi mode, a rotational speed of the engine 5 (i.e., a rotational speed of the input shaft 16) is reduced lower than a rotational speed of the ring gear 18 of the transmission section 10 when a rotational speed of the first motor 6 is reduced substantially to zero. Further, in the fixed mode, the engine 5 (or the input shaft 16) and the ring gear 18 of the transmission section 10 are rotated at substantially same speeds.

The EV mode may be selected from a dual-motor mode in which both of the first motor 6 and the second motor 7 generate drive torques to propel the vehicle, and a single-motor mode in which only the second motor 7 generates a drive torque to propel the vehicle. Further, the dual-motor mode may be selected from an electric vehicle-low mode (to be abbreviated as the "EV-Lo mode" hereinafter) in which a torque of the first motor 6 is multiplied by a relatively larger factor, and an electric vehicle-high mode (to be abbreviated as the "EV-Hi mode" hereinafter) in which a torque of the first motor 6 is multiplied by a relatively smaller factor.

FIG. 4 shows engagement states of the first clutch CL1, the second clutch CL2, and the first brake B1, and operating conditions of the first motor 6, the second motor 7, and the engine 5 in each operating mode. In FIG. 4, "●" represents that the engagement device is in engagement, "-" represents the engagement device is in disengagement, "G" represents that the motor serves mainly as a generator, "M" represents that the motor serves mainly as a motor, blank represents that the motor serves as neither a motor nor a generator or that the motor is not involved in propulsion of the hybrid vehicle, "ON" represents that the engine 5 generates a drive torque, and "OFF" represents that the engine 5 does not generate a drive torque.

Rotational speeds of the rotary elements of the power split mechanism 8, and directions of torques of the engine 5, the first motor 6, and the second motor 7 in each operating mode are indicated in FIGS. 5 to 10. In the nomographic diagrams shown in FIGS. 5 to 10, distances among the vertical lines represents a gear ratio of the power split mechanism 8, a vertical distance on the vertical line from the horizontal base line represents a rotational speed of the rotary member, an orientation of the arrow represents a direction of the torque, and a length of the arrow represents a magnitude of the torque.

Figure 5:
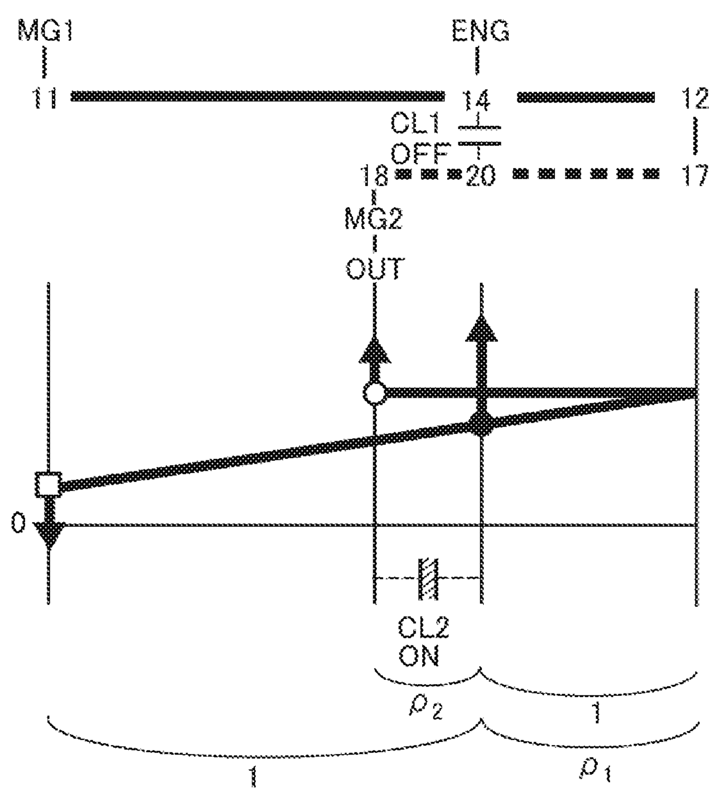
FIG. 5 is a nomographic diagram showing a situation in a HV-Hi mode.
Figure 6:
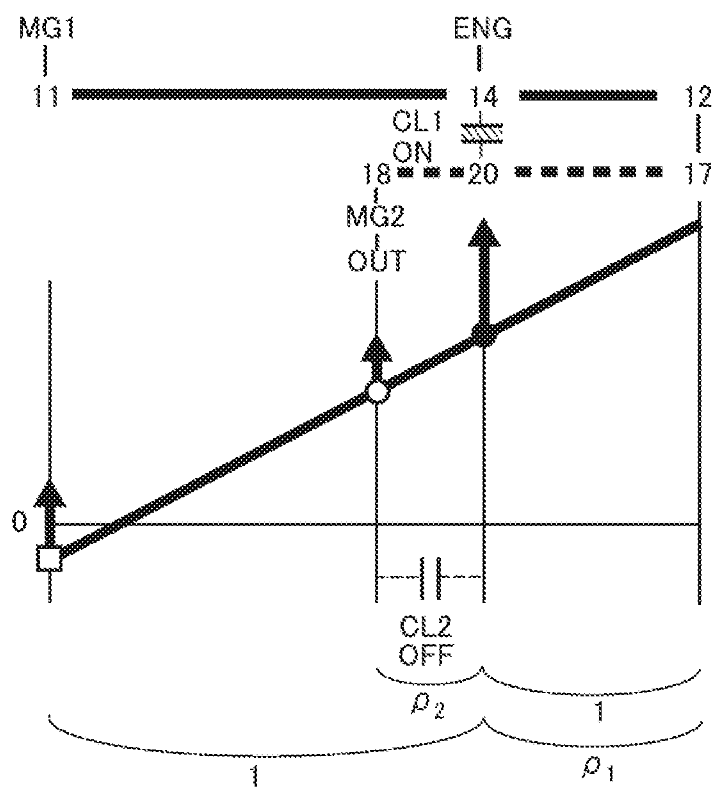
FIG. 6 is a nomographic diagram showing a situation in a HV-Lo mode.

As indicated in FIGS. 5 and 6, in the HV-Hi mode and the HV-Lo mode, any one of the first clutch CL1 and the second clutch CL2 is engaged, and the engine 5 generates a drive torque while establishing a reaction torque by the first motor 6. In this situation, a rotational speed of the first motor 6 is controlled in such a manner as to optimize a total energy efficiency in the first drive unit 2 including a fuel efficiency of the engine 5 and a driving efficiency of the first motor 6. Specifically, the total energy efficiency in the first drive unit 2 may be calculated by dividing a total energy consumption by a power to rotate the front wheels 1R and 1L. A rotational speed of the first motor 6 may be varied continuously, and the rotational speed of the engine 5 is governed by the rotational speed of the first motor 6 and a vehicle speed. That is, the power split mechanism 8 may serve as a continuously variable transmission.

As a result of establishing a reaction torque by the first motor 6, the first motor 6 may serve as a generator. In this situation, therefore, a power of the engine 5 is partially translated into an electric energy, and the remaining power of the engine 5 is delivered to the ring gear 18 of the transmission section 10. Specifically, the reaction torque established by the first motor 6 is governed by a split ratio of the torque delivered from the engine 5 to the first motor 6 side through the power split mechanism 8. Such split ratio between the torque delivered from the engine 5 to the first motor 6 side through the power split mechanism 8 and the torque delivered from the engine 5 to the ring gear 18 differs between the HV-Lo mode and the HV-Hi mode.

Given that the torque delivered to the first motor 6 side is "1", a ratio of the torque applied to the ring gear 18 in the HV-Lo mode may be expressed as "$1/(\mu 1-\rho 2)$", and a ratio of the torque applied to the ring gear 18 in the HV-Hi mode may be expressed as "$1/(\rho 1)$". In the above-expressed expressions, "$\rho 1$" is a gear ratio of the power split section 9 (i.e., a ratio between teeth number of the ring gear 12 and teeth number of the sun gear 11), and "$\rho 2$" is a gear ratio of the transmission section 10 (i.e., a ratio between teeth number of the ring gear 18 and teeth number of the sun gear 17).

In the HV mode, the electric power generated by the first motor 6 is supplied to the second motor 7, and in addition, the electric power accumulated in the battery 47 is also supplied to the second motor 7 as necessary. In the vehicle, the second motor 7 and the rear motor 30 are used to assist the drive torque generated by the engine 5. That is, the rear motor 30 may also be controlled in a similar manner as the second motor 7. In the following explanation, however, an example to assist the drive torque only by the second motor 7 will be explained. Accordingly, the HV-Hi mode and the HV-Lo mode correspond to a third mode and a hybrid mode of the exemplary embodiment.

Figure 7:
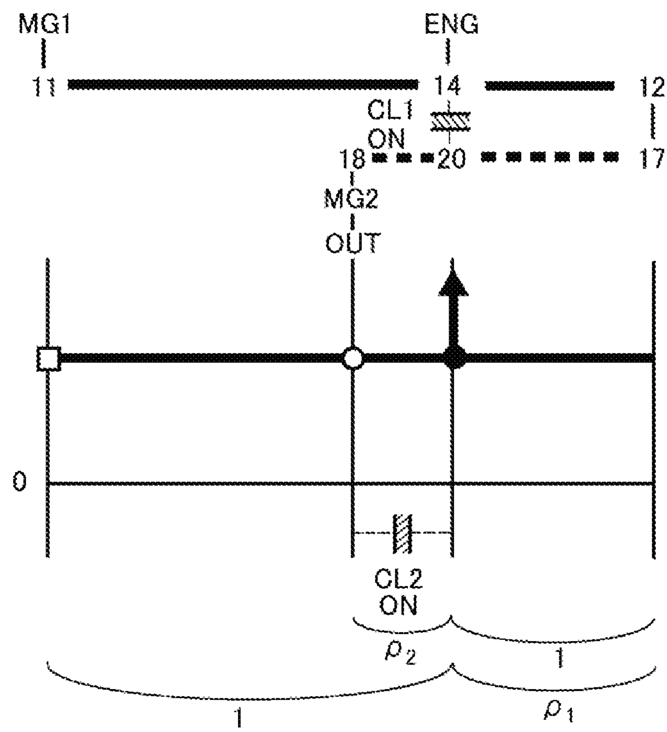
FIG. 7 is a nomographic diagram showing a situation in a fixed mode.

In the fixed mode, as indicated in FIG. 7, both of the first clutch CL1 and the second clutch CL2 are engaged so that all of the rotary elements in the power split mechanism 8 are rotated at a same speed. Specifically, the engine 5 and the front wheels 1R and 1L are rotated at a ratio governed by a gear ratio between the output gear 21 and the driven gear 23 and a gear ratio between the drive gear 24 and the ring gear 26, and an output power of the engine 5 is entirely delivered as a mechanical power to the front wheels 1R and 1L. In other words, the output power of the engine 5 will not be translated into an electric energy by the first motor 6 and the second motor 7. For this reason, a power loss associated with such energy conversion will not be caused in the fixed mode, and hence power transmission efficiency can be improved. Accordingly, the fixed mode corresponds to a first mode of the exemplary embodiment.

Figure 8:
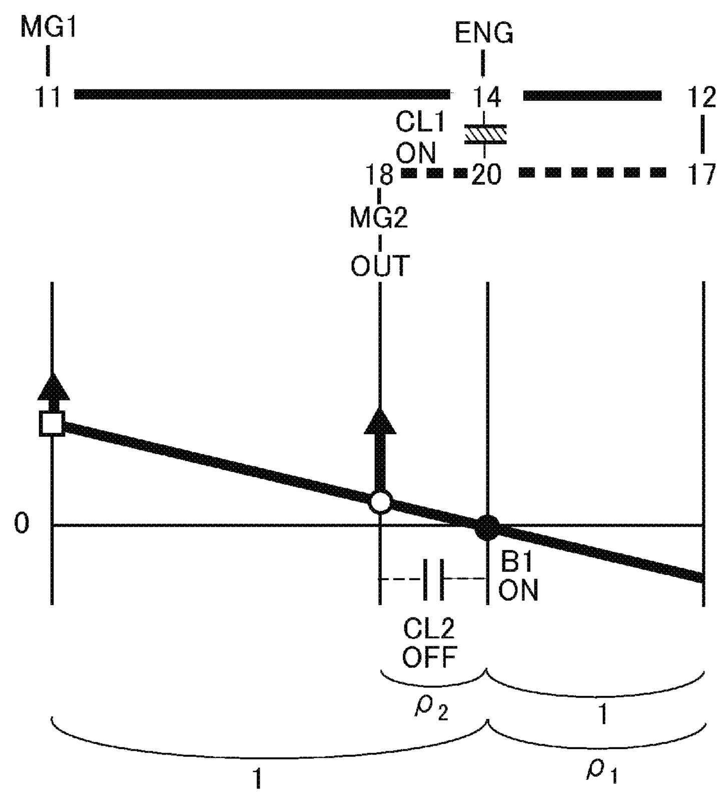
FIG. 8 is a nomographic diagram showing a situation in an EV-Lo mode.
Figure 9:
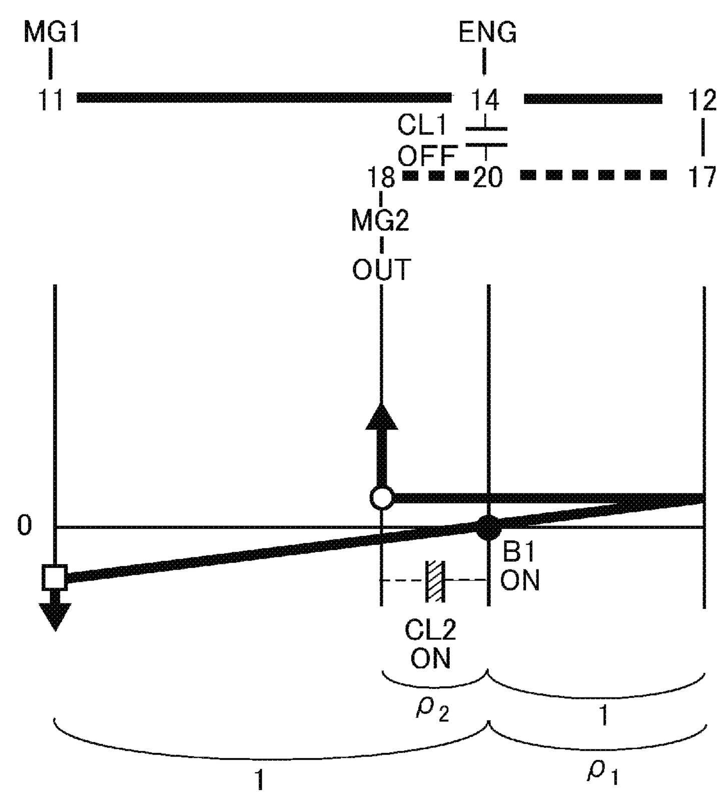
FIG. 9 is a nomographic diagram showing a situation in the EV-Hi mode.
Figure 10:
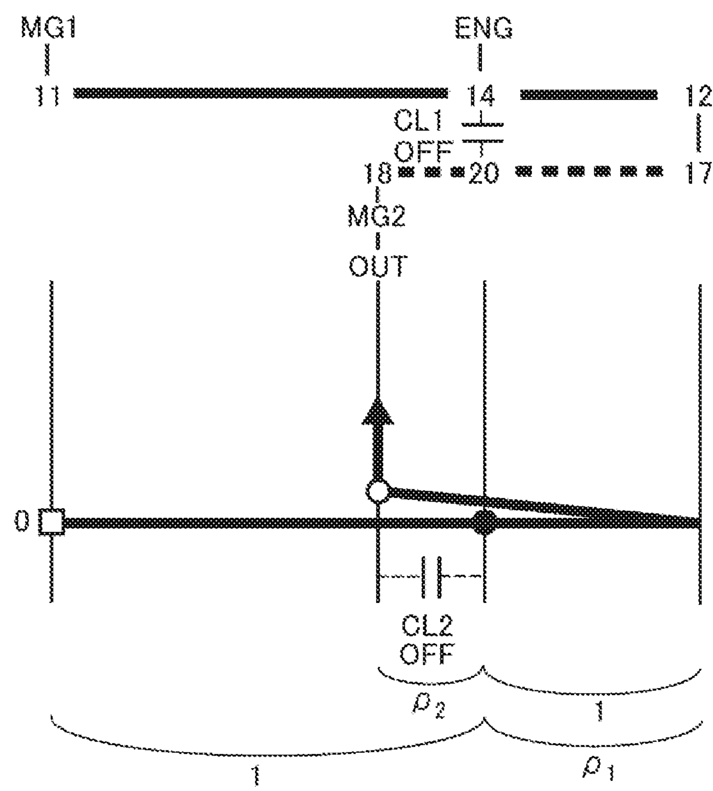
FIG. 10 is a nomographic diagram showing a situation in a single-motor mode.

As indicated in FIGS. 8 and 9, in the EV-Lo mode and the EV-Hi mode, the first brake B1 is engaged, and the first motor 6 and the second motor 7 generates the drive torques to propel the vehicle. In the EV-Lo mode, a ratio of a rotational speed of the ring gear 18 of the transmission section 10 to a rotational speed of the first motor 6 is reduced smaller than that in the EV-Hi mode. In other words, a speed reducing ratio in the EV-Lo mode is greater than that in the EV-Hi mode so that a greater drive force is established in the EV-Lo mode. As indicated in FIG. 10, in the single-motor mode, only the second motor 7 generates a drive torque, and both of the clutch CL1 and the second clutch CL2 are disengaged. In the single-motor mode, therefore, all of the rotary elements of the power split mechanism 8 are stopped. For this reason, the engine 5 and the first motor 6 will not be rotated passively, and hence the power loss can be reduced.

In the hybrid vehicle, the operating mode is selected on the basis of an SOC level of the battery 47, a vehicle speed, a required drive force and so on. According to the exemplary embodiment, a selection pattern of the operating mode may be selected from a CS (i.e., Charge Sustaining) mode in which the operating mode is selected in such a manner as to maintain the SOC level of the battery 47 as far as possible, and a CD (i.e., Charge Depleting) mode in which the operating mode is selected in such a manner as to propel the vehicle while consuming the electric power accumulated in the battery 47. Specifically, the CS mode is selected when the SOC level of the battery 47 is relatively low, and the CD mode is selected when the SOC level of the battery 47 is relatively high.

Figure 11:
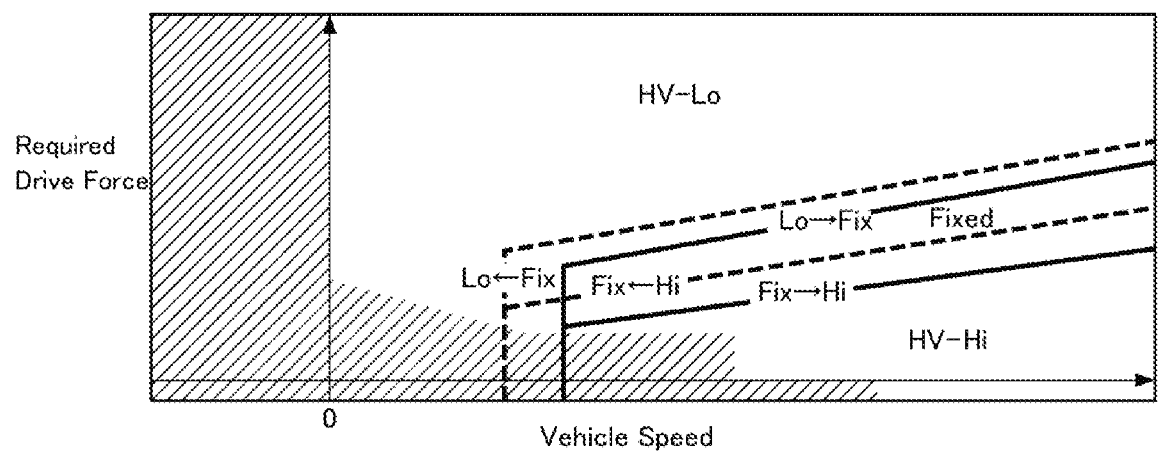
FIG. 11 shows a map for determining an operating mode during propulsion in a CS mode.

FIG. 11 shows an example of a map used to select the operating mode during propulsion in the CS mode. In FIG. 11, the vertical axis represents a required drive force, and the horizontal axis represents a vehicle speed. In order to select the operating mode of the hybrid vehicle, the vehicle speed may be detected by a vehicle speed sensor, and the required drive force may be estimated based on an accelerator position detected by an accelerator sensor.

In FIG. 11, the hatched area is an area where the single-motor mode is selected. In the CS mode, the single-motor mode is selected when the vehicle is propelled in a forward direction and the required drive force is small (or when decelerating). Such area where the single-motor mode is selected is determined based on specifications of the second motor 7 and the rear motor 30. In principle, when the vehicle is propelled in the reverse direction the single-motor mode is also selected.

During forward propulsion in the CS mode, the HV mode is selected when the large drive force is required. In the HV mode, the drive force may be generated from a low speed range to a high speed range. Therefore, when the engine 5 is required to be started to warmup the engine 5 itself and a catalyst (not shown), or when the SOC level falls close to a lower limit level, the HV mode may also be selected even if an operating point governed by the required drive force and the vehicle speed falls within the hatched area.

As described, the HV mode may be selected from the HV-Lo mode, the HV-Hi mode, and the fixed mode. In the CS mode, specifically, the HV-Lo mode is selected when the vehicle speed is relatively low and the required drive force is relatively large, the HV-Hi mode is selected when the vehicle speed is relatively high and the required drive force is relatively small, and the fixed mode is selected when the operating point falls between an area where the HV-Lo mode is selected and an area where the HV-Hi mode is selected.

In the CS mode, the operating mode is shifted from the fixed mode to the HV-Lo mode when the operating point is shifted across the "Lo←Fix" line from right to left, or when the operating point is shifted across the "Lo←Fix" line upwardly from the bottom. By contrast, the operating mode is shifted from the HV-Lo mode to the fixed mode when the operating point is shifted across the "Lo→Fix" line from left to right, or when the operating point is shifted across the "Lo→Fix" line downwardly from the top. Likewise, the operating mode is shifted from the HV-Hi mode to the fixed mode when the operating point is shifted across the "Fix←Hi" line from right to left, or when the operating point is shifted across the "Fix←Hi" line upwardly from the bottom. By contrast, the operating mode is shifted from the fixed mode to the HV-Hi mode when the operating point is shifted across the "Fix→Hi" line from left to right, or when the operating point is shifted across the "Fix→Hi" line downwardly from the top.

Figure 12:
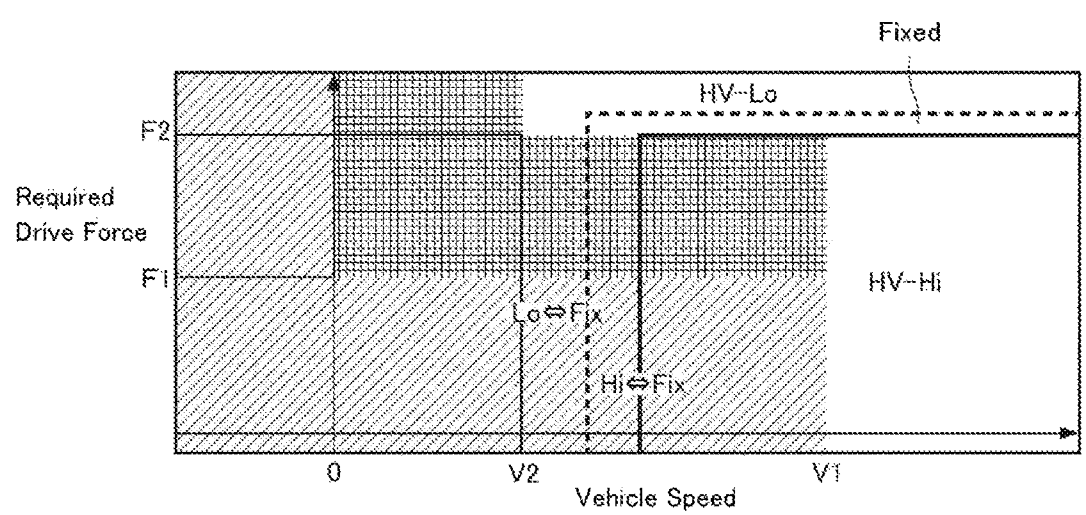
FIG. 12 shows a map for determining an operating mode during propulsion in a CD mode.

FIG. 12 shows an example of a map used to select the operating mode during propulsion in the CD mode. In FIG. 12, the vertical axis also represents the required drive force, and the horizontal axis also represents the vehicle speed.

In FIG. 12, the hatched area is also an area where the single-motor mode is selected. In the CD mode, the single-motor mode is selected when the vehicle is propelled in the forward direction and the required drive force is smaller than a first threshold force value F1 (or when decelerating). Such area where the single-motor mode is selected is also determined based on specifications of the second motor 7 and the rear motor 30. In principle, when the vehicle is propelled in the reverse direction, the single-motor mode is also selected.

During forward propulsion in the CD mode, the dual-motor mode is selected when the drive force larger than the first threshold force value F1 is required. In this case, the HV mode is selected when the vehicle speed is higher than a first threshold speed V1, or when the vehicle speed is higher than a second threshold speed V2 and the required drive force is greater than a second threshold force value F2. As described, the drive force may be generated entirely from the low speed range to the high speed range in the HV mode. When the SOC level of the battery 47 falls close to the lower limit level, therefore, the HV mode may be selected even if the operating point falls within the areas where the single-motor mode and the dual-motor mode are selected.

In the CD mode, the HV-Lo mode is also selected when the vehicle speed is relatively low and the required drive force is relatively large, the HV-Hi mode is also selected when the vehicle speed is relatively high and the required drive force is relatively small, and the fixed mode is also selected when the operating point falls between the area where the HV-Lo mode is selected and the area where the HV-Hi mode is selected.

In the CD mode, the operating mode is shifted between the fixed mode and the HV-Lo mode when the operating point is shifted across the "Lo↔Fix" line. Likewise, the operating mode is shifted between the HV-Hi mode and the fixed mode when the operating point is shifted across the "Fix↔Hi".

In the maps shown in FIGS. 11 and 12, the areas of each of the operating mode and the lines defining the areas may be altered depending on temperatures of the members of the first drive unit 2, the battery 47, the power control systems 44, 45, and 46, and the SOC level of the battery 47.

When the vehicle thus far explained passes over a bump, or when the front wheels 1R and 1L slip on a road surface, rotational speeds of the front wheels 1R and 1L are increased abruptly. Then, when the slipping front wheels 1R and 1L grip the road surface again, the speeds of the front wheels 1R and 1L are reduced abruptly. In this case, if the vehicle propels in the fixed mode, and the speed of at least one of the front wheels 1R and 1L is reduced close to zero, a speed of the engine 5 may also be reduced to a level at which an engine stall is caused. In order to avoid such disadvantage, when an idling or a slip of the front wheels 1R or 1L as a drive wheel is detected, the control system shifts the operating mode from the fixed mode in which the engine 5 and the front wheels 1R and 1L are rotated at predetermined speed ratio to the other mode. That is, an occurrence of idling of the drive wheels is employed as a condition to shift the operating mode.

Figure 13:
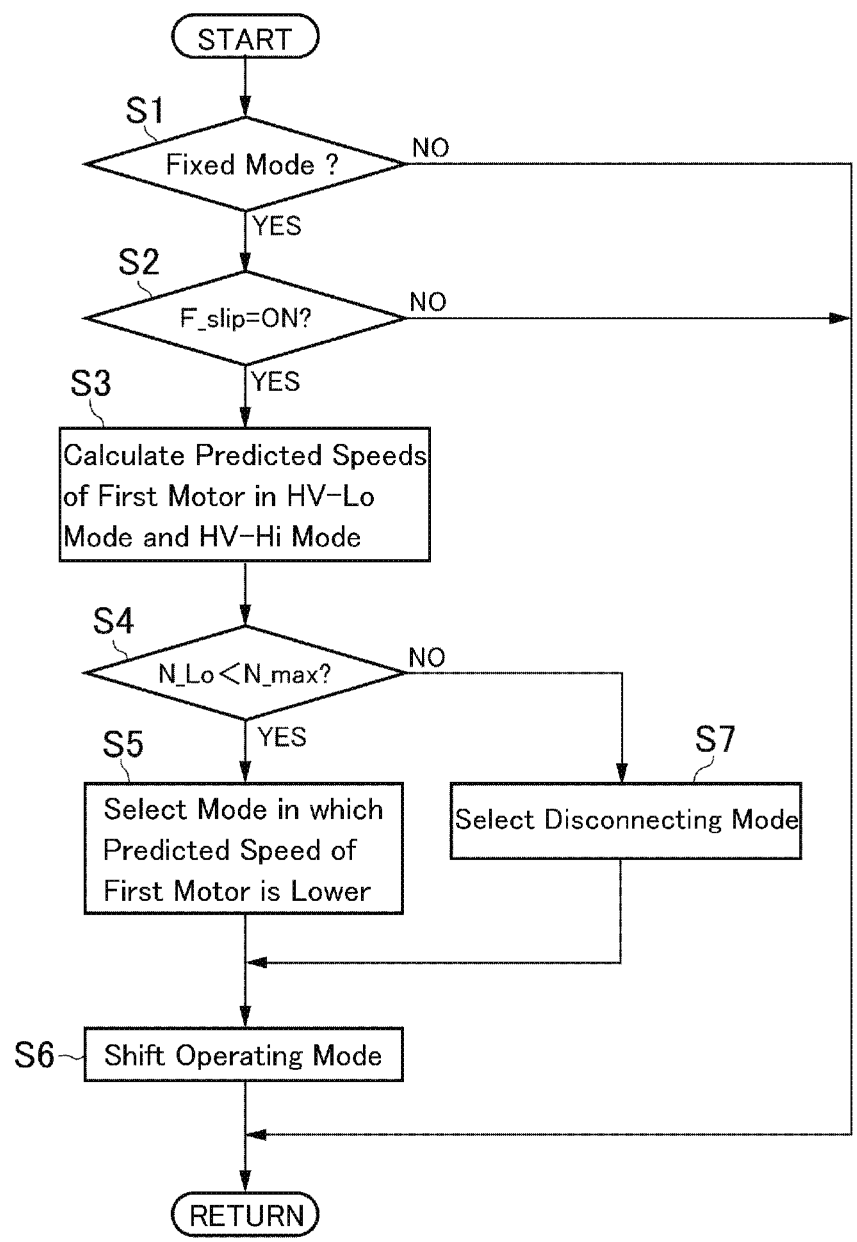
FIG. 13 is a flowchart showing one example of a routine executed by the control system according to the embodiment.

Turning now to FIG. 13, there is shown one example of a routine to be executed by the controller. At step S1, it is determined whether the vehicle is propelled in the fixed mode in which the engine 5 and the pair of front wheels 1R and 1L are rotated at a predetermined speed ratio (i.e., at a fixed speed ratio). For example, such determination at step S1 may be made based on engagement states of the first clutch CL1 and the second clutch CL2, and an output signal from the ECU 48.

If the vehicle is not propelled in the fixed mode so that the answer of step S1 is NO, the routine returns. By contrast, if the vehicle is propelled in the fixed mode so that the answer of step S1 is YES, the routine progresses to Step S2 to determine whether at least one of the front wheel 1R and 1L as the drive wheel idles based on a fact that the drive wheel slips. At step S2, specifically, it is determined whether a slip flag F_slip is turned on. For example, the slip flag F_slip is turned on when a difference between a vehicle speed detected by the vehicle speed sensor and a vehicle speed calculated based on a speed of the countershaft (as will be also called the "output shaft" hereinafter) 22 is greater than a predetermined value. However, a means for detecting an occurrence of a slip of the front wheels 1R or 1L is not limited to a specific means. For example, an occurrence of a slip of the front wheels 1R or 1L may be detected by comparing a vehicle speed calculated based on a speed of at least one of the front wheels 1R and 1L detected by the wheel speed sensor with a vehicle speed calculated based on a speed of at least one of the rear wheels 3R and 3L detected by the wheel speed sensor.

If the slip flag F_slip is turned off so that the answer of step S2 is NO, the routine returns. By contrast, if the slip flag F_slip is turned on so that the answer of step S2 is YES, the operating mode is shifted from the fixed mode to the mode in which the engine speed will not be reduced to the speed at which an engine stall is expected to be caused. In this case, specifically, the operating mode will be shifted to the HV-Lo mode, the HV-Hi mode, or the single-motor mode (also referred to as the "disconnecting mode" hereinafter) in which both of the first clutch CL1 and the second clutch CL2 are disengaged. For example, when the slipping front wheel 1R or 1L grips the road surface again in the HV-Lo mode or the HV-Hi mode, a torque of the power split mechanism 8 is changed by a torque delivered from said front wheel 1R or 1L. However, a speed of the first motor 6 is changed by such change in the torque of the power split mechanism 8 so that the torque delivered from said front wheel 1R or 1L is absorbed by such change in the speed of the first motor 6. Otherwise, when the slipping front wheel 1R or 1L grips the road surface again in the disconnecting mode, a speed of the carrier 20 is changed by the torque delivered from said front wheel 1R or 1L so that the torque delivered from said front wheel 1R or 1L is absorbed by such change in the speed of the carrier 20. Accordingly, the disconnecting mode corresponds to a second mode of the exemplary embodiment.

For example, when a large drive force impossible to be generated in the EV mode is demanded, or when the SOC level of the battery 47 is too low to propel the vehicle, the HV mode has to be selected. Taking account of such situations, it is preferable to maintain the HV mode in the event of a slip of at least one of the front wheels 1R and 1L. According to the exemplary embodiment, therefore, a possibility of shifting the operating mode to any of the HV-Lo mode and the HV-Hi mode is determined preferentially in the event of a slip of at least one of the front wheels 1R and 1L. Specifically, at step S3, a predicted speed of the first motor 6 of a case in which the slipping front wheel 1R or 1L grips the road surface again in the HV-Lo mode is calculated, given that that the speeds of said front wheels 1R and 1L are zero, and based on an engine speed when the slip occurred and a gear ratio of the power split mechanism 8. At the same time, a predicted speed of the first motor 6 of a case in which the slipping front wheel 1R or 1L grips the road surface again in the HV-Hi mode is calculated, given that the speeds of said front wheels 1R and 1L are zero, and based on an engine speed when the slip occurred and a gear ratio of the power split mechanism 8. Accordingly, the engine speed when a slip of at least one of the front wheels 1R and 1L occurs corresponds to a first predetermined speed of the exemplary embodiment.

Then, it is determined at step S4 whether a lower predicted speed N_Lo of the first motor 6 out of the predicted speed in the HV-Lo mode and the predicted speed in the HV-Hi mode is lower than a maximum allowable speed N_max of the first motor 6. That is, at step S4, it is determined whether the vehicle can be propelled in the HV-Lo mode or the HV-Hi mode in which the speed of the first motor 6 is lower without damaging the first motor 6.

If the lower predicted speed N_Lo is lower than the maximum allowable speed N_max so that the answer of step S4 is YES, the routine progresses to step S5, to select the operating mode from the HV-Lo mode and the HV-Hi mode in which the predicted speed of the first motor 6 is lower (i.e., the predicted speed is N_Lo). In this case, the drive force will not be restricted to prevent the speed of the first motor 6 from increasing higher than the maximum allowable speed N_max, even if a required drive force increases when or immediately after the slipping front wheel 1R or 1L grips the road surface again. Thereafter, the routine progresses to step S6 to shift the operating mode from the fixed mode to the selected mode, and returns. Accordingly, any one of the HV-Lo mode and the HV-Hi mode in which the predicted speed of the first motor 6 is lower corresponds to a fifth mode of the exemplary embodiment, and the other one of the HV-Lo mode and the HV-Hi mode in which the predicted speed of the first motor 6 is higher corresponds to a fourth mode of the exemplary embodiment.

Otherwise, if the lower predicted speed N_Lo is higher than the maximum allowable speed N_max so that the answer of step S4 is NO, the routine progresses to step S7 to select the disconnecting mode. Thereafter, the routine progresses to step S6 to shift the operating mode from the fixed mode to the disconnecting mode, and returns.

Figure 14:
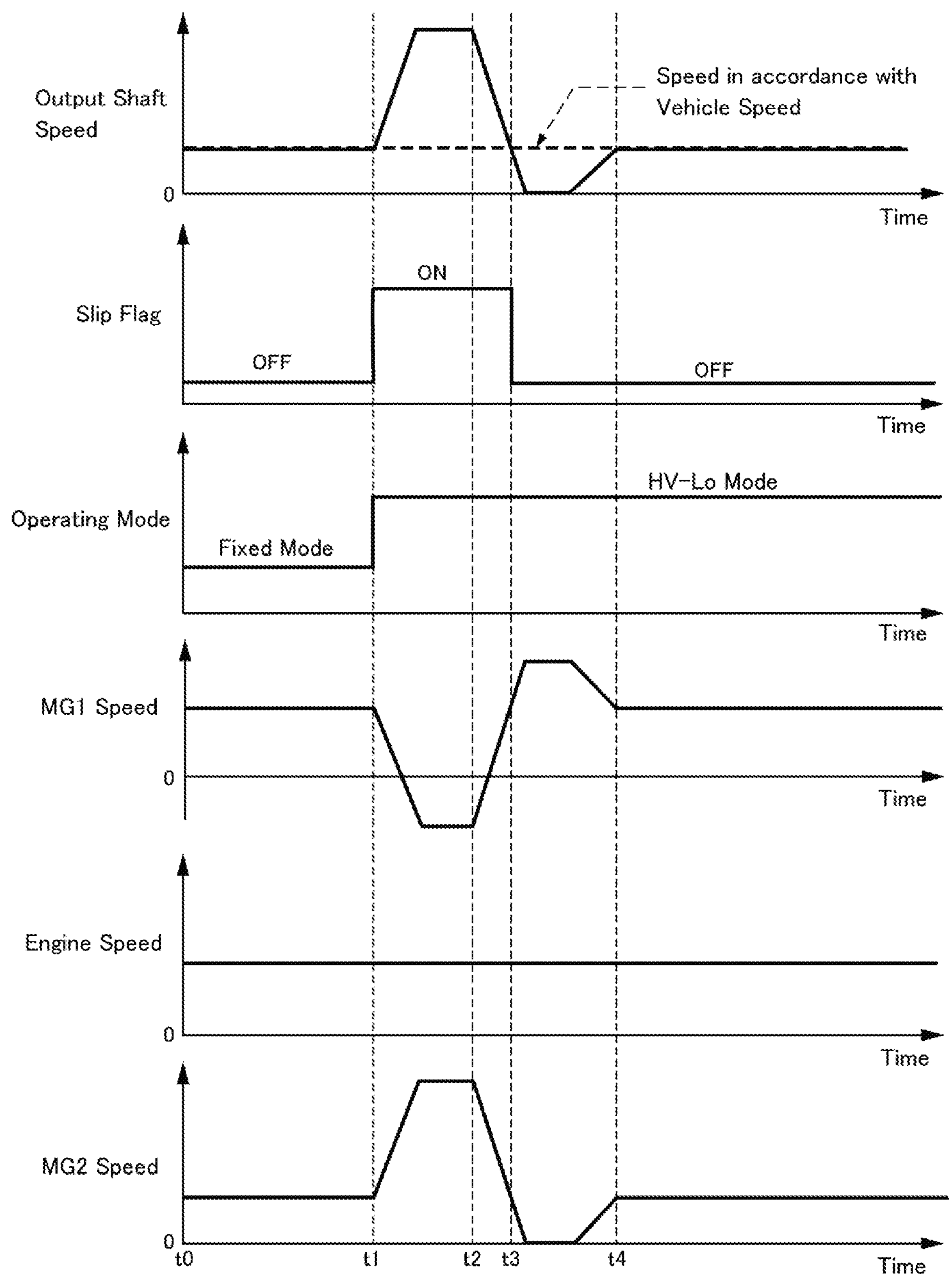
FIG. 14 is a time chart showing an example of shifting the operating mode to the HV-Lo mode when slippage is detected.

FIG. 14 shows a temporal change of the operating mode in the case of shifting the operating mode to the HV-Lo mode when at least one of the front wheels 1R and 1L slips in the fixed mode. In the example shown in FIG. 14, at point to, the vehicle is propelled in the fixed mode. In this situation, the engine 5 and the first motor 6 are rotated at a same speed in accordance with a vehicle speed. Likewise, the output shaft connected to the front wheels 1R and 1L such as the counter shaft 22, and the second motor 7 are also rotated at the same speed in accordance with the vehicle speed.

When at least one of the front wheels 1R and 1L slips at point t1, the rotational speeds of the output shaft and the second motor 7 are increased, and the slip flag F_slip is turned on. In the example shown in FIG. 14, the predicted speed of the first motor 6 is lower in the HV-Lo mode than that in the HV-Hi mode, and the lower predicted speed N_Lo of the first motor 6 in the HV-Lo mode is lower than the maximum allowable speed N_max. In this case, therefore, the operating mode is shifted from the fixed mode to the HV-Lo mode by disengaging the second clutch CL2. While at least one of the front wheels 1R and 1L is slipping, a torque of the first motor 6 is maintained to a torque when the slip of at least one of the front wheels 1R and 1L occurred. That is, the first motor 6 generates a torque of same magnitude as a torque delivered from the engine 5 to the first motor 6. In this situation, therefore, the speed of the output shaft is increased and the speed of the first motor 6 is reduced while maintaining the engine speed, by shifting the operating mode to the HV-Lo mode, and as a result of idling of at least one of the front wheels 1R and 1L.

When the slip of at least one of the front wheels 1R and 1L terminates and the slipping front wheels grips the road surface again at point t2, the rotational speeds of the front wheels 1R and 1L are reduced abruptly. As a result, the rotational speeds of the output shaft and the second motor 7 are reduced. On the other hand, since an inertial force of the first motor 6 is smaller than an inertial force of the engine 5, the rotational speed of the first motor 6 is increased with a reduction in the rotational speed of the output shaft. That is, an energy resulting from the reduction in the rotational speeds of the front wheels 1R and 1L is absorbed by the change in the rotational speed of the first motor 6. For this reason, when at least one of the front wheels 1R and 1L slips, an engine stall as might be caused by a reduction in the engine speed can be prevented.

Then, when the rotational speed of the output shaft is lowered to a speed in accordance with the vehicle speed at point t3, the slip flag F_slip is turned off. Eventually, the rotational speed of the output shaft is lowered to zero, and increased again to the speed in accordance with the vehicle speed at point t4. Consequently, the rotational speed of the first motor 6 is reduced and the rotational speed of the second motor 7 is increased. After point t4, the operating mode may be not only shifted to the fixed mode again but also maintained to the HV-Lo mode.

Figure 15:
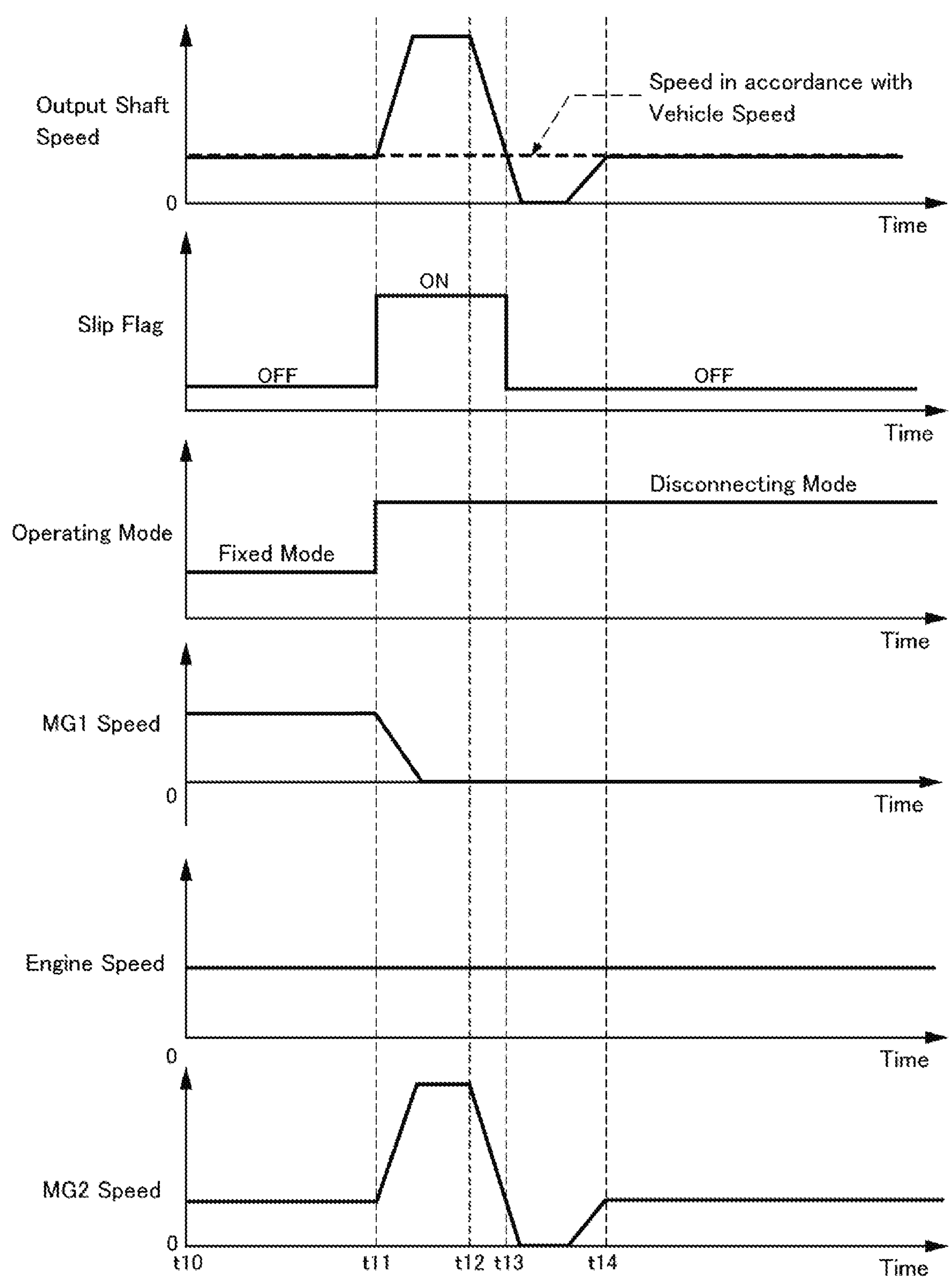
FIG. 15 is a time chart showing an example of shifting the operating mode to a disconnecting mode when slippage is detected.

FIG. 15 shows a temporal change of the operating mode in the case of shifting the operating mode to the disconnecting mode when at least one of the front wheels 1R and 1L slips in the fixed mode. In the example shown in FIG. 15, at point to, the vehicle is propelled in the fixed mode. In this situation, the engine 5, the first motor 6, and the output shaft such as the counter shaft 22 are rotated at a same speed in accordance with a vehicle speed.

When at least one of the front wheels 1R and 1L slips at point t11, the speeds of the output shaft and the second motor 7 are increased, and the slip flag F_slip is turned on. In the example shown in FIG. 15, both of the predicted speeds of the first motor 6 in the HV-Lo mode and the HV-Hi mode are higher than the maximum allowable speed N_max. In this case, therefore, the operating mode is shifted from the fixed mode to the disconnecting mode by disengaging the first clutch CL1 and the second clutch CL2. While at least one of the front wheels 1R and 1L is slipping, the first motor 6 is stopped while maintaining the engine speed. Therefore, the rotational speed of the first motor 6 is reduced gradually from point t11.

When the slip of at least one of the front wheels 1R and 1L terminates and the slipping front wheels grips the road surface again at point t12, the rotational speeds of the front wheels 1R and 1L are reduced abruptly. As a result, the rotational speeds of the output shaft and the second motor 7 are reduced. In the disconnecting mode, torque is not delivered to the first motor 6 and the engine 5 from the front wheels 1R and 1L. In this situation, therefore, the engine speed is maintained to a constant speed, and the first motor 6 is still stopped. For this reason, when at least one of the front wheels 1R and 1L slips, an engine stall as might be caused by a reduction in the engine speed can be prevented. In the case of thus shifting the operating mode to the disconnecting mode, the second motor 7 is connected to the front wheels 1R and 1L, and the rear motor 30 is connected to the rear wheels 3R and 3L. In this case, therefore, drive force to propel the vehicle and stability of the vehicle will not be reduced.

Then, when the rotational speed of the output shaft is lowered to a speed in accordance with the vehicle speed at point t13, the slip flag F_slip is turned off. Eventually, the rotational speed of the output shaft is lowered to zero, and increased again to the speed in accordance with the vehicle speed at point t14. Consequently, the rotational speed of the second motor 7 is increased. After point t14, the operating mode may be not only shifted to the fixed mode again but also maintained to the disconnecting mode.

Thus, when at least one of the drive wheels slips during propulsion in the operating mode in which the engine and the drive wheels are rotated at a predetermined fixed ratio, the operating mode is shifted to the mode in which the vehicle is propelled while establishing a reaction torque by the first motor, or to the mode in which a torque transmission between the engine and the drive wheels is interrupted. According to the exemplary embodiment, therefore, the engine speed will not be reduced when the drive wheels grip the road surface again. For this reason, an occurrence of engine stall can be prevented.

In addition, in the case of shifting to the mode in which the vehicle is propelled while establishing a reaction torque by the first motor, a required drive force can be achieved immediately after the slipping drive wheels grip the road surface again. In this case, therefore, acceleration response will not be reduced and the driver will not feel uncomfortable feeling. Otherwise, in the case of shifting to the mode in which a torque transmission between the engine and the drive wheels is interrupted, the torque of the drive wheels will not be delivered to the engine. In this case, therefore, an occurrence of engine stall can be prevented even if the drive wheel slips and grips the road surface again.

Specifically, when the front wheels slips during propulsion in the fixed mode, the operating mode is shifted to the HV-Lo mode, HV-Hi mode, or the disconnecting mode. In the HV-Lo mode, HV-Hi mode, and the disconnecting mode, the drive force can be generated while preventing an excessive application of torque to the engine when the slipping drive wheel grips the road surface again. That is, the drive force can be controlled according to need even if the operating mode is shifted to those modes. For this reason, the drive force and the stability of the vehicle will not be reduced even if the operating mode is shifted to those modes to prevent an occurrence of engine stall.

Although the above exemplary embodiments of the present disclosure have been described, it will be understood by those skilled in the art that the present disclosure should not be limited to the described exemplary embodiments, and various changes and modifications can be made within the scope of the present disclosure. For example, a structure of the power split mechanism 8 may be modified according to need. In addition, the control system according to the exemplary embodiment may also be applied to a vehicle in which the operating mode in which the vehicle is propelled while establishing a reaction torque by the first motor is not available. In this case, the operating mode may be shifted to a neutral mode when slip of the drive wheel is detected.

What is claimed is:

1. A control system for a vehicle comprising:

a controller that selects an operating mode from a first mode in which an engine and drive wheels are rotated at a predetermined speed ratio and at least any one of a) a second mode in which a torque transmission between the engine and the drive wheels is interrupted, and the vehicle is propelled by a drive torque generated by a driving rotary machine connected to the drive wheels; b) a third mode in which the vehicle is propelled by delivering an output torque of the engine to the drive wheels while establishing a predetermined reaction torque by a predetermined rotary member; c) a fourth mode in which the predetermined rotary member is rotated at a second predetermined speed if the drive wheels stop and the engine is rotated at a first predetermined speed; and d) a fifth mode in which the predetermined rotary member is rotated at a speed lower than the second predetermined speed in the fourth mode given that the drive wheels stop and the engine is rotated at the first predetermined speed, wherein the controller is configured to determine whether at least one of the drive wheels idles during propulsion in the first mode, wherein the controller is configured to shift the operating mode from the first mode to the second mode or the third mode upon determination of idling of the at least one of the drive wheels, and wherein the third mode includes the fifth mode.

2. The control system for the vehicle as claimed in claim 1, wherein the operating mode of the vehicle can be selected from the second mode and the third mode, and wherein the controller is further configured to maintain a rotational speed of the engine at the first predetermined speed when at least one of the drive wheels idles, and calculate the speed lower than the second predetermined speed in a case in which the drive wheels stop in the third mode, upon determination of idling of the at least one of the drive wheels, determine whether predicted speed of the predetermined rotary member is higher than a maximum allowable speed of the predetermined rotary member, select the third mode upon determination of idling of the at least one of the drive wheels, in a case that the predicted speed of the predetermined rotary member is lower than the maximum allowable speed of the predetermined rotary member, and select the second mode upon determination of idling of the at least one of the drive wheels, in a case that the predicted speed of the predetermined rotary member is higher than the maximum allowable speed of the predetermined rotary member.

3. The control system for the vehicle as claimed in claim 2, wherein the predetermined rotary member includes a first rotary machine, the vehicle comprises a drive unit that performs a differential action among at least a first rotary element connected to the engine, a second rotary element connected to the first rotary machine, and a third rotary element connected to the drive wheels, and the third mode includes a hybrid mode in which the output torque of the engine is delivered to the drive wheels by establishing a reaction torque by the first rotary machine.

4. The drive force control system for a hybrid vehicle as claimed in claim 3, wherein the drive unit comprises a plurality of rotary elements including the first rotary element, the second rotary element, and the third rotary element, a first engagement device that selectively connects a predetermined pair of the rotary elements, and a second engagement device that selectively connects another predetermined pair of the rotary elements, the first mode is established by engaging both of the first engagement device and the second engagement device, the second mode is established by disengaging both of the first engagement device and the second engagement device, and the third mode is established by engaging any one of the first engagement device and the second engagement device while disengaging the other one of the first engagement device and the second engagement device.

5. The control system for the vehicle as claimed in claim 1, wherein the predetermined rotary member includes a first rotary machine, the vehicle comprises a drive unit that performs a differential action among at least a first rotary element connected to the engine, a second rotary element connected to the first rotary machine, and a third rotary element connected to the drive wheels, and the third mode includes a hybrid mode in which the output torque of the engine is delivered to the drive wheels by establishing a reaction torque by the first rotary machine.

6. The drive force control system for a hybrid vehicle as claimed in claim 5, wherein the drive unit comprises a plurality of rotary elements including the first rotary element, the second rotary element, and the third rotary element, a first engagement device that selectively connects a predetermined pair of the rotary elements, and a second engagement device that selectively connects another predetermined pair of the rotary elements, the first mode is established by engaging both of the first engagement device and the second engagement device, the second mode is established by disengaging both of the first engagement device and the second engagement device, and the third mode is established by engaging any one of the first engagement device and the second engagement device while disengaging the other one of the first engagement device and the second engagement device.

7. A control system for a vehicle comprising:

a controller that selects an operating mode from a first mode in which an engine and drive wheels are rotated at a predetermined speed ratio and at least any one of a) a second mode in which a torque transmission between the engine and the drive wheels is interrupted, and the vehicle is propelled by a drive torque generated by a driving rotary machine connected to the drive wheels and b) a third mode in which the vehicle is propelled by delivering an output torque of the engine to the drive wheels while establishing a predetermined reaction torque by a predetermined rotary member, wherein the operating mode of the vehicle can be selected from the second mode and the third mode, and wherein the controller is further configured to maintain a rotational speed of the engine at a speed when at least one of the drive wheels idles, and calculate a predicted speed of the predetermined rotary member in a case in which the drive wheels stop in the third mode, determine whether the predicted speed of the predetermined rotary member is higher than a maximum allowable speed of the predetermined rotary member, select the third mode upon determination of idling the at least one of the drive wheels, in a case that the predicted speed of the predetermined rotary member is lower than the maximum allowable speed of the predetermined rotary member, and select the second mode upon determination of idling of the at least one of the drive wheels, in a case that the predicted speed of the predetermined rotary member is higher than the maximum allowable speed of the predetermined rotary member.

8. The control system for the vehicle as claimed in claim 7, wherein the predetermined rotary member includes a first rotary machine, the vehicle comprises a drive unit that performs a differential action among at least a first rotary element connected to the engine, a second rotary element connected to the first rotary machine, and a third rotary element connected to the drive wheels, and the third mode includes a hybrid mode in which the output torque of the engine is delivered to the drive wheels by establishing a reaction torque by the first rotary machine.

9. The drive force control system for a hybrid vehicle as claimed in claim 8, wherein the drive unit comprises a plurality of rotary elements including the first rotary element, the second rotary element, and the third rotary element, a first engagement device that selectively connects a predetermined pair of the rotary elements, and a second engagement device that selectively connects another predetermined pair of the rotary elements, the first mode is established by engaging both of the first engagement device and the second engagement device, the second mode is established by disengaging both of the first engagement device and the second engagement device, and the third mode is established by engaging any one of the first engagement device and the second engagement device while disengaging the other one of the first engagement device and the second engagement device.

10. A control system for a vehicle comprising:

a controller that selects an operating mode from a first mode in which an engine and drive wheels are rotated at a predetermined speed ratio and at least any one of a) a second mode in which a torque transmission between the engine and the drive wheels is interrupted, and the vehicle is propelled by a drive torque generated by a driving rotary machine connected to the drive wheels and b) a third mode in which the vehicle is propelled by delivering an output torque of the engine to the drive wheels while establishing a predetermined reaction torque by a predetermined rotary member, wherein the controller is configured to determine whether at least one of the drive wheels idles during propulsion in the first mode, the controller is configured to shift the operating mode from the first mode to the second mode or the third mode upon determination of idling of the at least one of the drive wheels, the predetermined rotary member includes a first rotary machine, the vehicle comprises a drive unit that performs a differential action among at least a first rotary element connected to the engine, a second rotary element connected to the first rotary machine, and a third rotary element connected to the drive wheels, and the third mode includes a hybrid mode in which the output torque of the engine is delivered to the drive wheels by establishing the reaction torque by the first rotary machine.

11. The drive force control system for a hybrid vehicle as claimed in claim 10, wherein the drive unit comprises a plurality of rotary elements including the first rotary element, the second rotary element, and the third rotary element, a first engagement device that selectively connects a predetermined pair of the rotary elements, and a second engagement device that selectively connects another predetermined pair of the rotary elements, the first mode is established by engaging both of the first engagement device and the second engagement device, the second mode is established by disengaging both of the first engagement device and the second engagement device, and the third mode is established by engaging any one of the first engagement device and the second engagement device while disengaging the other one of the first engagement device and the second engagement device.

* * * * *

UNITED STATES PATENT AND TRADEMARK OFFICE

CERTIFICATE OF CORRECTION

PATENT NO. : 11,007,997 B2
APPLICATION NO. : 16/366450
DATED : May 18, 2021
INVENTOR(S) : Yukari Okamura et al.

It is certified that error appears in the above-identified patent and that said Letters Patent is hereby corrected as shown below:

In the Claims

- In Column 16, Line 46, Claim 2, please delete “determine whether predicted speed of the predetermined” insert --determine whether a predicted speed of the predetermined--.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*